(12) United States Patent
Tattum et al.

(10) Patent No.: US 8,574,478 B2
(45) Date of Patent: Nov. 5, 2013

(54) SLIP ADDITIVE COMPOSITION IN THERMOPLASTIC POLYMER PROCESSING

(75) Inventors: Steven Burgess Tattum, Grimsargh (GB); Matthew Jackson, Warrington (GB)

(73) Assignee: Colormatrix Europe Limited, Merseyside (GB)

( * ) Notice: Subject to any disclaimer, the term of this patent is extended or adjusted under 35 U.S.C. 154(b) by 0 days.

(21) Appl. No.: 12/562,337

(22) Filed: Sep. 18, 2009

(65) Prior Publication Data

US 2010/0076127 A1 Mar. 25, 2010

Related U.S. Application Data

(63) Continuation of application No. 10/571,477, filed on Mar. 10, 2006, now abandoned.

(30) Foreign Application Priority Data

Sep. 10, 2003 (GB) .................................. 0321131.5

(51) Int. Cl.
*B29C 45/14* (2006.01)
*C08K 5/10* (2006.01)

(52) U.S. Cl.
USPC ............ 264/259; 524/312; 524/313; 524/318

(58) Field of Classification Search
USPC ........................... 264/259; 524/312, 313, 318
See application file for complete search history.

(56) References Cited

U.S. PATENT DOCUMENTS

| | | | | |
|---|---|---|---|---|
| 3,247,142 A * | 4/1966 | Brunson et al. | ............... | 524/310 |
| 4,637,957 A * | 1/1987 | Murase | ......................... | 428/395 |
| 4,965,301 A * | 10/1990 | Leininger | ..................... | 524/101 |
| 5,115,004 A * | 5/1992 | Mochizuki et al. | ........... | 524/107 |
| 5,164,436 A * | 11/1992 | Maier et al. | .................... | 524/290 |
| 5,641,825 A * | 6/1997 | Bacskai et al. | ................. | 524/398 |
| 6,068,910 A * | 5/2000 | Flynn et al. | ................... | 428/141 |
| 6,521,155 B1 * | 2/2003 | Wunsch | ....................... | 264/150 |
| 6,827,897 B2 * | 12/2004 | Hall et al. | ..................... | 264/523 |
| 7,220,815 B2 * | 5/2007 | Hayes | ........................... | 528/272 |

FOREIGN PATENT DOCUMENTS

JP   02003192920 A * 7/2003

* cited by examiner

*Primary Examiner* — Tae H Yoon
(74) *Attorney, Agent, or Firm* — Fay Sharpe LLP

(57) ABSTRACT

The present invention relates to the use of a fatty acid ester as a slip additive in the production of molded polyethylene terephthalate articles, to a thermoplastic molding composition comprising a polyethylene terephthalate and a fatty acid ester selected to be effective for reducing the co-efficient of friction of molded articles formed from the composition, to a molded polyethylene terephthalate article comprising a fatty acid ester selected to be effective in reducing the co-efficient of friction of the molded article, and to a process for producing a molded thermoplastic article comprising providing a thermoplastic molding composition comprising polyethylene terephthalate, admixing with the thermoplastic molding composition at least one fatty acid ester selected to be effective in reducing the co-efficient of friction of the molded article, heating the composition and molding the hot composition so as to form a molded article.

18 Claims, 2 Drawing Sheets

SLIP ADDITIVE COMPOSITION IN THERMOPLASTIC POLYMER PROCESSING

This application is a continuation filing from U.S. Ser. No. 10/571,477, filed Mar. 10, 2006, now abandoned.

This invention relates to the use of certain materials as slip additive compositions in polymer processing, to thermoplastic moulding compositions, to moulded articles produced therefrom, and to a process for producing such moulded articles.

Thermoplastic polymers are widely employed in the manufacture of packaging items. One large application for polyethylene terephthalate, in particular, is in the manufacture of food packaging items and, in particular, beverage bottles. Such beverage bottles are extensively used for carbonated soft drinks and are increasingly more attractive, for safety considerations, in the packaging of alcoholic beverages, such as beer.

Other uses for thermoplastic polymers, including polyesters such as polyethylene terephthalate, include the manufacture of packages for agrochemicals, cosmetics, detergents and the like.

Polyethylene terephthalate bottles are usually manufactured using a two-stage process. Granules of polyethylene terephthalate, along with any relevant additives, are injection moulded in a first step to produce a preform. The resulting preform is then blow moulded, possibly at a different factory, in a second step to the desired shape. Machines are also available which make bottle preforms and then blow them immediately into bottles.

Polyethylene terephthalate used for injection moulding purposes is typically post-condensed and has a molecular weight in the region of about 25,000 to 30,000. However, it has also been proposed to use a fibre grade polyethylene terephthalate, which is cheaper but is non-post-condensed, with a lower molecular weight in the region of about 20,000. It has further been suggested to use copolyesters of polyethylene terephthalate which contain repeat units from at least 85 mole % terephthalic acid and at least 85 mole % of ethylene glycol. Dicarboxylic acids which can be included, along with terephthalic acid, are exemplified by phthalic acid, isophthalic acid, naphthalene-2,6-dicarboxylic acid, cyclohexanedicarboxylic acid, cyclohexanediacetic acid, diphenyl-4,4'-dicarboxylic acid, succinic acid, glutaric acid, adipic acid, azelaic acid and sebacic acid. Other diols which may be incorporated in the copolyesters, in addition to ethylene glycol, include diethylene glycol, triethylene glycol, 1,4-cyclohexanedimethanol, propane-1,3-diol, butane-1,4-diol, pentane-1,5-diol, hexane-1,6-diol, 3-methylpentane-2,4-diol, 2-methyl pentane-1,4-diol, 2,2,4-trimethylpentane-1,3-diol, 2-ethylhexane-1,3-diol, 2,2-diethylpropane-1,3-diol, hexane-1,3-diol, 1,4-di(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, and 2,2-bis-(4-hydroxypropoxyphenyl)-propane. In this specification the term "polyethylene terephthalate" includes not only polyethylene terephthalate but also such copolyesters.

One property of thermoplastic preforms, and subsequent moulded products, of interest to manufacturers, and subsequent processors, of moulded thermoplastic articles, is the co-efficient of friction of the moulded preform, or of the blow moulded finished article. Generally, once a manufacturer of thermoplastic preforms has produced a large number of such articles, the preforms must then be packaged in a suitable container for subsequent transport to a blow moulding station, possibly at a different factory, and possibly under the control of another operator. It is in the interests of the manufacturer to fill a particular container with as many preforms as possible in order to reduce packaging space, with concomitant reduction in transport costs, warehouse space and associated costs. One particular type of container which is commonly used to package and transport moulded thermoplastic preforms is the so-called Octabin.

The number of thermoplastic preforms that can be filled into a particular Octabin, or similar container, is clearly related to the shape and size of the thermoplastic preforms in question. However, for a given shape and size of thermoplastic preform, the number of such preforms that will fill a container is also related to the co-efficient of friction of the preforms. Preforms with a relatively lower co-efficient of friction will slip down inside the container and thus provide a denser packing of the preforms. In the case of a large container storing a large number of preforms, the co-efficient of friction can play a significant part in determining the number of such preforms that can be charged to the container.

It is an object of the invention to provide an improved slip additive for reducing the co-efficient of friction of moulded thermoplastic preforms, and/or articles blow-moulded therefrom. In particular, it is an object of the invention to provide such an additive that can be used in conjunction with polyethylene terephthalate. It is further an object of the invention to provide moulded thermoplastic polyethylene terephthalate preforms with improved co-efficient of friction properties, and yet with acceptable appearance and other physical characteristics.

According to the present invention, there is provided the use of a fatty acid ester as a slip additive in the production of moulded polyethylene terephthalate articles.

Slip additives such as fatty amides and mineral oils are commonly used in the processing of thermoplastic compounds. In polyolefin processing, slip additives are generally selected from fatty amide additives, such as erucamide and oleamide. However, these additives are problematic in polyethylene terephthalate due to high processing temperatures, which can lead to yellowing of the polymer and the release of volatile materials. Discolouration is a particularly acute problem in the processing of clear polyethylene terephthalate.

The inventors have discovered that fatty acid esters can be used to reduce co-efficient of friction in polyethylene terephthalate while avoiding the problems associated with fatty amides.

Suitable fatty acid esters include, but are not limited to: glycerol fatty acid esters, such as glycerol monooleate, glycerol monoricinolate, glycerol monopalmitate and glycerol monostearate; acetylated glycerol fatty acid esters, such as ethoxylated glycerol monostearate; sorbitan fatty acid esters, such as sorbitan monolaurate, sorbitan monooleate, sorbitan monopalmitate and sorbitan monostearate; refined rapeseed oil; montanic acid triglyceride; PEG-400 dilaurate; PEG-200 dioleate; and acetylated triglyceride. However, it will be appreciated that the selection of a particular fatty acid ester, or mixture of fatty acid esters, optionally in combination with other agents such as mineral oils, appropriate to a particular process is a matter to be determined according to the requirements of the process (the moulding temperature, injection rate and sample volume, for example), the requirements of the processor (with regard to the characteristics of the end product, for example) and the nature of the material being processed.

Preferably the fatty acid ester is a long chain fatty acid ester. Preferably the chain length is at least about ten, more preferably at least about twelve, for example from twelve to eighteen.

One aspect of the present invention focuses on the selection of one or more materials for a slip additive composition in polyethylene terephthalate processing which effectively improve the slip properties of articles moulded from the polyethylene terephthalate without adversely affecting the optical properties, in particular the clarity or haze, of the moulded articles to an unacceptable degree. Thus, in one of its aspects the invention provides a thermoplastic moulding composition comprising polyethylene terephthalate and a slip additive composition comprising at least one fatty acid ester, the slip additive composition being present in the moulding composition in an amount effective to reduce the coefficient of friction of a moulded article formed from the moulding composition by at least about 25%, preferably at least about 35%, more preferably at least about 45% and most preferably at least about 55% relative to the coefficient of friction of a corresponding moulded article formed from the moulding composition in the absence of the slip additive.

One convenient method for measuring the coefficient of friction of the moulded article is described herein below. Preferably, the reduction in coefficient of friction is achieved within a short time, for example within two hours, preferably within one hour, after moulding of the article.

Preferably, the slip additive composition is selected for effective reduction of the coefficient of friction of the moulded article and for effective maintenance of a desired optical property of the moulded article. In particular, the slip additive composition may be selected for effective maintenance of the clarity of the moulded article. Another optical property of the moulded article, which is preferably maintained by selection of the slip additive composition, is haze.

Therefore, the invention further provides a thermoplastic moulding composition comprising polyethylene terephthalate and a slip additive composition comprising at least one fatty acid ester, the slip additive composition being present in the moulding composition in an amount effective to reduce the coefficient of friction of a moulded article formed from the moulding composition by at least about 25%, preferably at least about 35%, more preferably at least about 45% and most preferably at least about 55% relative to the coefficient of friction of a corresponding moulded article formed from the moulding composition in the absence of the slip additive, the slip additive composition being selected effectively to maintain at least one optical property of the moulded article with respect to that at least one optical property of the corresponding moulded article formed from the moulding composition in the absence of the slip additive. The at least one optical property is preferably one or both of clarity and haze.

Maintenance of the at least one optical property is preferably such that any difference in said at least one optical property of the moulded article compared to the corresponding moulded article formed from the moulding composition in the absence of the slip additive is barely visible, preferably substantially invisible, to the naked eye.

Preferably, such maintenance of said at least one optical property of the moulded article persists for at least several days, preferably at least several weeks and more preferably at least several months after moulding of the article, and most preferably persists throughout the useful commercial lifetime of said article.

It will be apparent to those skilled in the art that the selection of a particular fatty acid ester, or combination of fatty acid esters, to achieve the desired properties of reduced coefficient of friction and maintained optical properties in a particular polyethylene terephthalate moulded article will be influenced by a number of factors, including the molecular weight and degree of unsaturation of the polymer, the presence of other additives or colourants in the thermoplastic moulding composition, the processing conditions, such as temperature and shear rate, during moulding of the composition, and other characteristics of the mould. The examples in this specification indicate some preferred selections of slip additive materials but it will be apparent that there are many different types of selection from such materials, and from fatty acid esters generally, which may be made to achieve the desired properties of the moulded article referred to herein above.

Although the amount of slip additive composition to be added to the thermoplastic moulding composition will generally be selected according to the particular characteristics and properties referred to above, generally the slip additive composition will be added in an amount of at least about 0.1% w/w, preferably at least about 0.3% w/w, more preferably at least about 0.4% w/w and most preferably at least about 0.5% w/w of the thermoplastic moulding composition. Fatty acid esters, or mixtures thereof make up at least a part of the slip additive composition and preferably make up a substantial proportion (for example at least about 25%, 40%, 50%, 60% or more) thereof.

Typical temperatures required for injection moulding of polyethylene terephthalate moulding compositions are between about 260° C. and about 285° C. or higher, e.g. up to about 310° C. Somewhat lower temperatures in excess of about 100° C. up to about 170° C. or more are generally used in the blow moulding step to produce a bottle from a polyester preform. It is preferred that the slip additive be able to withstand such processing temperatures.

The use of the invention provides significant advantages in the processing of polyethylene terephthalate and, in particular in the production of moulded polyethylene terephthalate preforms, for example:

Improvement of packing efficiency as preforms are boxed at the end of the moulding line. This leads to reductions in transport and storage costs per unit.

Reduced friction can reduce the damage to the surface of the preforms, leading to improved bottle quality.

Friction reduction can also improve the ease of processing in subsequent blowing lines.

The invention accordingly provides a thermoplastic moulding composition comprising a polyethylene terephthalate and a fatty acid ester selected to be effective for reducing the co-efficient of friction of moulded articles formed from the composition.

Typically the modified thermoplastic moulding composition is injection moulded to form a bottle preform and the resulting bottle preform is then blow moulded to form a bottle.

Fatty acid esters are commonly used as additives in the colouring of thermoplastic materials, including polyethylene terephthalate. However, the inventors believe that the co-efficient of friction properties of such materials have not hitherto been recognised. It is believed that the fatty acid ester chemistry developed for use in liquid colorants can be further optimised to provide the desired friction reduction properties required for polyethylene terephthalate processing. Careful selection of the types of esters used can produce products designed to target specific friction reduction requirements.

Friction reduction in polyolefins is brought about by the presence of additives at the surface of the moulded part that decrease friction. Reduced co-efficient of friction is a result of the migration of slip additive to the part surface due to the defined incompatibility of the slip additive with the polymer. Migration of slip agent to the surface is controlled by:

The compatibility of the slip additive with the polymer and morphology of the polymer.

The molecular weight of the additive. (Oleamides migrate faster than erucamides, for example.)

The amphiphilic nature of the additive molecule. Molecules with surfactant properties tend to migrate towards the interface.

According to the present invention there is provided a moulded polyethylene terephthalate article comprising a fatty acid ester selected to be effective in reducing the co-efficient of friction of the moulded article.

In the moulded article of the invention, the fatty acid ester is preferably not homogenously dispersed throughout the substrate polymer but, rather, is preferentially located towards or at the surface of the substrate so as to impart a slip characteristic to the polymer surface. Such preferential location may occur by migration of the fatty acid ester through the substrate towards the surface thereof.

The invention further provides a process for producing a moulded thermoplastic article comprising providing a thermoplastic moulding composition comprising polyethylene terephthalate, admixing with the thermoplastic moulding composition at least one fatty acid ester selected to be effective in reducing the co-efficient of friction of the moulded article, heating the composition and moulding the hot composition so as to form a moulded article.

The use of fatty acid esters as slip additives in the processing of polyethylene terephthalate in accordance with the invention is especially applicable to the processing of clear polyethylene terephthalate and to the production of colourless moulded polyethylene terephthalate articles therefrom.

Accordingly, the fatty acid ester used in the invention is preferably colourless or only slightly coloured.

The fatty acid ester, or mixture of fatty acid esters, used in the invention may optionally be combined with conventional slip additives, provided the presence of such conventional additives does not adversely affect the appearance or other characteristic of the end product to an unacceptable degree. Examples of conventional slip additives include unsaturated fatty acid amides such as oleamide. Blending of slip additives, and any other additive for incorporation in a thermoplastic moulding composition according to the invention, can be achieved by a simple blending operation, for example by direct addition of the desired amount of the mixture to the polyethylene terephthalate fed to an extruder. Alternatively, prior mixing with the polyethylene terephthalate in a Banbury or other mixing device can be employed.

Other additives that may be incorporated with the slip additive include, for example. UV absorbers, acetaldehyde reducing additives, oxygen scavengers and carbon dioxide barrier materials, for example.

Similarly, it may be preferred in some cases to blend the fatty acid ester, or mixture of fatty acid esters, with a slip additive having lower compatibility with polyethylene terephthalate, such as white mineral oil for example. In such a combined additive, the fatty acid ester need not necessarily be the major component in the combined additive, although of course it can be.

Thus, in one of its aspects the invention provides a slip additive for incorporation into a polyethylene terephthalate moulding composition, the slip additive comprising a fatty acid ester having a first compatibility with the polyethylene terephthalate and a further slip agent having a second compatibility with the polyethylene terephthalate, the second compatibility being lower than the first compatibility.

The reference here to "compatibility" means that, when the moulding composition is moulded the migration rate towards the surface of the resulting moulded article of the lower compatibility agent is faster than the corresponding migration rate of the fatty acid ester. The lower compatibility agent may be regarded as having a lower solubility in the polyethylene terephthalate than does the fatty acid ester.

The lower compatibility slip agent may, for example, be a mineral oil, such as white mineral oil.

One particularly advantageous aspect of the present invention is that slip performance in a moulded article can be achieved at relatively low addition rates of slip additive. If a slip additive must be incorporated in a thermoplastic moulding composition at a high level (over 0.5% w/w for example), the risk of adversely affecting other characteristics of the polymer (appearance, for example) is increased. Since the slip additive functions by migrating to the polymer surface, high addition rates are particularly unfavourable in food contact applications. Thus, in the invention the slip additive comprising fatty acid ester is preferably included in the moulding composition in an amount of no more than about 0.5% w/w. It has been discovered that incorporation of slip additive comprising fatty acid ester even at such low rates has significant benefits in reducing co-efficient of friction.

The slip additive composition for use in the present invention may be used in conjunction with a polyethylene terephthalate-compatible organic liquid carrier. Alternatively, the additive composition may be used on its own, or may be used as a liquid carrier for other additives.

The invention will now be more particularly described with reference to the following Figures and Examples, in which.

EXAMPLES

A number of candidates for slip additives were selected. The effect of each candidate slip additive was measured by adding the candidate material(s) to the polymer feed of a preform moulding machine, producing a preform by a standard injection moulding process, and measuring the effect on the co-efficient of friction of the resultant preforms.

Preparation of Preforms

Samples of polyethylene terephthalate performs were prepared using Voridian 9921W polymer, dried at 170° C. 1 Kg aliquots of polymer were mixed thoroughly in a sealed polypropylene pot. The prepared samples were then moulded, under defined machine conditions, on a Husky GL160 moulding machine fitted with a two-cavity preform tool. Each polymer/additive sample was added to the moulding machine, while running clear polyethylene terephthalate, by pouring directly into the feed throat when the screw is just exposed as the clear polymer is almost consumed, allowing the operator to then count the number of shots contained in the barrel (eight in this case) plus two more shots. Preforms were then collected until the sample was exhausted. Sample parts were then collected while wearing disposable gloves and stored in sealable polythene bags until ready for testing. This is to prevent contamination of the preform surface, which could affect the results of the co-efficient of friction measurement.

Measurement of Co-efficient of Friction

Figure 1:
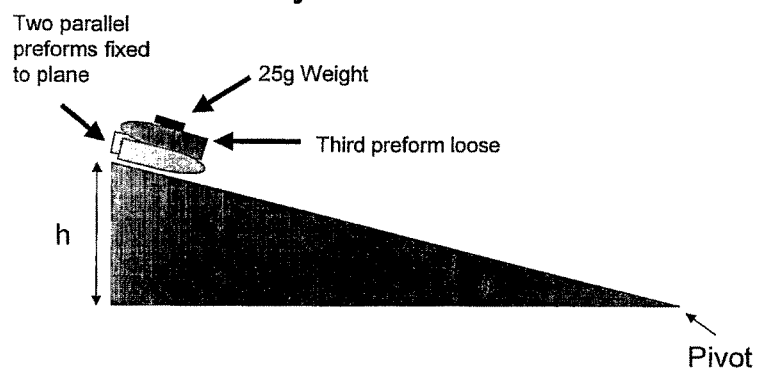
FIG. 1 shows diagrammatically a front elevation of apparatus designed to measure the co-efficient of friction of a bottle preform.
Figure 2:
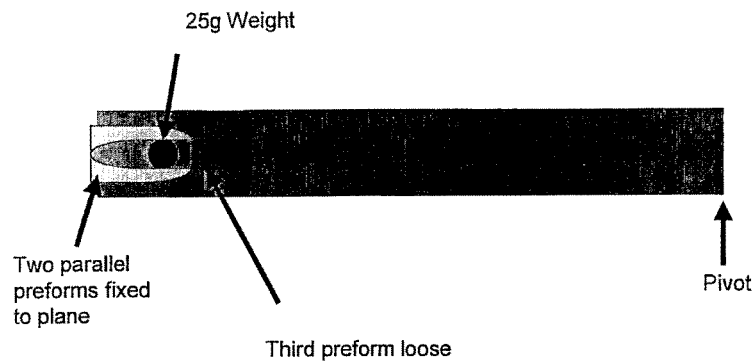
FIG. 2 shows a diagrammatic plan view of the apparatus depicted in FIG. 1.

Co-efficient of friction of the preforms was measured by an inclined plane method, using preforms as test pieces, as shown in FIGS. 1 and 2. The inclined plane takes the form of a wedge of Perspex of dimensions 60×10 cm, which is pivoted at its apex. A graduated scale is positioned opposite the apex, so that degree of inclination of the plane can be measured. Two of the sample preforms are fixed to the plane using a suitable adhesive. It may be necessary to cut away the top section of the preform using a plastic conduit cutter, so that the sidewall section of the preform lies parallel to the plane of the Perspex. A 25 g weight is then attached to the wall of the test preform about half way along the sidewall section. The test preform can than be placed on the fixed preforms so that the weight is upper most. The plane can then be slowly lifted until the test preform slides away form the fixed preform. The height at which the preform slides away form the fixed preforms can than read from the scale and recorded. For useful measurements the following points should be noted.

- Many factors can affect the co-efficient of friction of polyethylene terephthalate. It is therefore necessary the measure a control sample of preforms, with no additive incorporated, for each moulding session.
- The rate at which the angle of the Perspex is increased may affect the results, so care must be taken to ensure that the plane is lifted at approximately the same rate each time.
- The preforms should be placed in the same starting position each time a measurement is made.

The same fixed preforms are used to measure the slip angle of several separate sample preforms. Because of the relatively high degree of test variability, ten measurements are made for each sample. The results are then expressed as the mean of the ten measurements. The Student's T-Test can then be used to compare the results to the control and gauge the significance of differences in results (giving a P value).

The coefficient of friction is equal to the Tangent of the slip angle ($\theta$). This is calculated as:

$$\text{co-efficient of friction} = \operatorname{Tan}\{\operatorname{Sin}^{-1}(h/l)\}$$

Where . . . h=Height to which plane is raised, l=length of inclined plane.

Initial Screening of Slip Additive Candidates

Based on experience with existing products a range of additives was tested. Initial preform samples were obtained from a single moulding session and were measured for co-efficient of friction after approx 1 hour after manufacture and at seven days after manufacture. The performance of the montanic acid triglyceride was measured after 24 hours, as it was already known to require migration time in order to function.

The effect of increasing surface roughness of the polymer was examined using the addition of precipitated silica (Neosyl AC from Ineos silicas) and micronised talc (Microtal SF). These materials have some friction reduction effect but are not as active as some of the ester compounds and have the added disadvantage of increasing the opacity of the base polymer.

The results, shown in Table 1 demonstrate that fatty acid esters give superior performance to non-ester compounds, such as the mineral oil and PEG-4. The rate of migration is also much slower in the montanic acid ester than in the other ester products, due its higher molecular weigh and saturated nature.

TABLE 1

Initial Screening of Slip Additives for polyethylene terephthalate

| Code/Ref | Description | Dosage % on polymer | After 1 hour approx CoF* | P Value (T-test) vs control) | After 7 Days CoF* | P Value (T-test) vs 1 hour |
|---|---|---|---|---|---|---|
| — | Untreated polyethylene terephthalate Control | — | 1.08 | — | 0.90 | 0.070 |
| RV-4900 | Refined Rapeseed Oil | 0.1 | 0.66 | 0.004 | 0.49 | 0.226 |
| Clear Slip-12 | Montanic acid triglyceride | 0.1 | 0.95 | 0.192 | — | — |
| Clear Slip-12 | Montanic acid triglyceride | 0.1 | 0.60 (24 hrs) | <0.001 (24 hrs) | 0.48 | 0.120 |
| RV-5022 | PEG-400 Dilaurate | 0.1 | 0.81 | 0.016 | 0.54 | 0.008 |
| RA-876 | PEG-200 Dioleate | 0.1 | 0.68 | 0.001 | 0.53 | 0.074 |
| RA-876 | PEG-200 Dioleate | 0.5 | 0.59 | <0.001 | 0.35 | 0.002 |
| TA-189 | Acetylated Triglyceride (Grinsted Acetem 90 00) | 0.1 | 0.88 | 0.424 | 0.79 | 0.891 |
| TA-154 | Glycerol monopalmitate | 0.1 | 0.94 | 0.217 | 0.67 | 0.172 |
| RV-5201 | Ethoxylated Glycerol Monostearate | 0.1 | 0.73 | 0.149 | 0.70 | 0.856 |
| RA-870 | Glycerol monostearate (Atmer129) | 0.1 | 0.64 | 0.017 | 0.74 | 0.131 |
| Non ester materials for comparison | | | | | | |
| RV-5021 | White Mineral Oil | 0.1 | 0.86 | 0.030 | | |
| RA-898 | Neosyl AC | 0.2 | 0.79 | 0.007 | — | — |
| Microtal | Micronised Talc | 0.2 | 0.88 | 0.051 | — | — |
| MJ5.153.2 | 24% Neosyl, 40% RA-876, 36% RV-4900 | 0.1 | 0.67 | 0.027 | 0.62 | 0.618 |

TABLE 1-continued

Initial Screening of Slip Additives for polyethylene terephthalate

| Code/Ref | Description | Dosage % on polymer | After 1 hour approx | | After 7 Days | |
|---|---|---|---|---|---|---|
| | | | CoF* | P Value (T-test) vs control) | CoF* | P Value (T-test) vs 1 hour |
| PEG-4 | Polyethylene Glycol MWT average 200 | | 0.99 | 0.24 | — | — |
| Colorant products | | | | | | |
| Afterglow Red-1 | Liquid Colorant Product* | 1.0 | 0.29 | <0.001 | — | — |
| Afterglow Colorants | Dye/Pigment combination No liquid vehicle | 1.0 equivalent** | 1.17 | 0.631 | — | — |

*CoF = co-efficient of friction

Improving Packing Efficiency of Preforms Using Slip Additives

It was postulated that fast migration rates are required to produce more efficient packing in the drop boxes at the end of the preform moulding line. In theory the rate of migration would be faster as compatibility decreases. This would suggest the use of a relatively low compatibility additive, e.g. white mineral oil (WOM 68cSt) to produce greater reduction in friction. However, this can also lead to haze in the finished preform, due to phase separation. This can be alleviated to some extent by blending the mineral oil with a fatty acid ester, which has improved compatibility (MJ5.169.1, 4 and 5), or by using a more compatible additive at a higher % addition rate (MJ5.169.6 and 7). This was tested by moulding the preforms and measuring the co-efficient of friction immediately after the moulding run was completed. As a comparison the same materials were moulded again, using a similar set of process parameters, but with a longer cooling time. This extended the cycle time and thereby increased the residence time of the polymer and slip additive in the extruder barrel.

| Code | % Addition Rate | Description | Co-efficient of friction | |
|---|---|---|---|---|
| | | | 25 s Cycle Time | 35 s Cycle Time |
| MJ5.169.1 | 0.25 | 75:25 RV5021:RV4900 | 1.12 | 1.23 |
| MJ5.169.4 | 0.25 | 75:25 RV5021:RV2400 | 0.80 | 0.78 |
| MJ5.169.5 | 0.25 | 75:25 RV5021:RV4055 | 0.84 | 1.32 |
| MJ5.169.6 | 0.50 | 22:37:41 RV5022:RA876:RV4900 | 0.82 | 1.05 |
| MJ5.169.7 | 0.50 | TA-189 | 0.66 | 1.02 |
| | | Clear polyethylene terephthalate Control | 1.77 | 1.73 |

Key:
RV4900 - Refined Rapeseed Oil
RV5021 - White Mineral Oil, 68 cSt @ 40° C.
RV2400 - Sorbitan Trioleate
RV-4055 - Sorbitan Monolaurate
RA-876 - PEG 200 Dioleate
RV-5022 - PEG 400 Dilaurate
TA-189 - Acetylated Fatty Acid Glyceride (Grinstead Acetem 90 00 ex Danisco)

Figure 3:
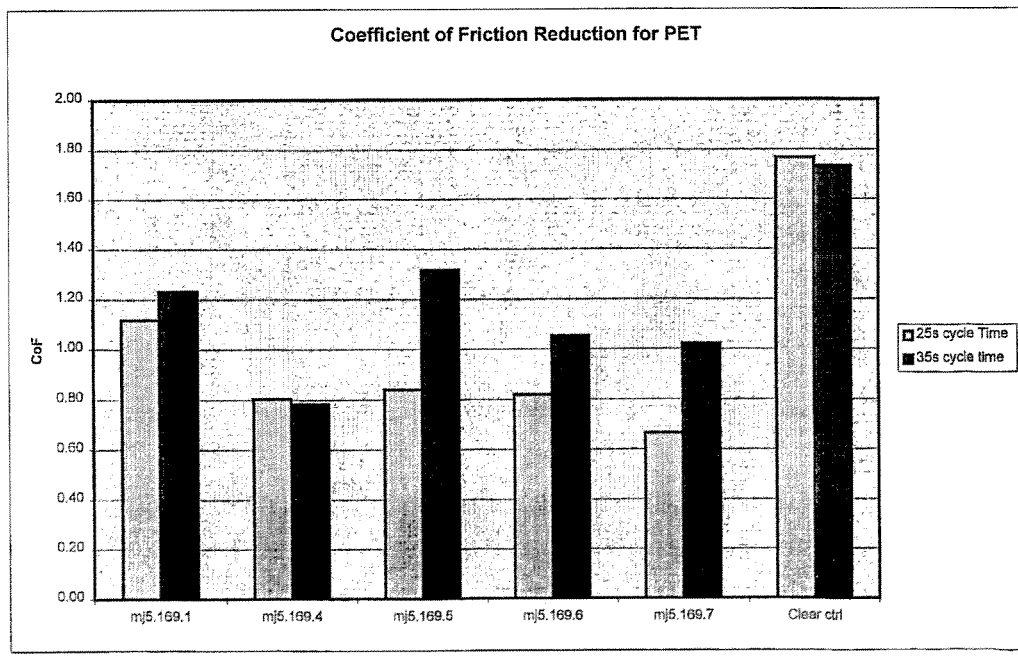
FIG. 3 shows in graphical form the relationship between co-efficient of friction and cycle time for certain preforms exemplified below.

These results, presented graphically in FIG. 3, show that the MJ5.169.4,5,6 and 7 all perform similarly at 25 s cycle time but that higher compatibility reduces performance at higher cycle times. For preforms manufactured on a commercial scale the moulding cycle times are typically less than 20 s which means that all of these samples are likely to give even better performance than is demonstrated here. This is because there is less time for the additive to become fully incorporated into the polymer matrix in the commercial process.

It is envisaged that the low compatibility, low addition rate samples would be the preferred option for a slip additive product as this would provide the greatest benefit against cost. However, many polyethylene terephthalate preform production machines are characterised by the low shear conditions in the barrel when coupled with very short cycle times. This leads to the potential for haze if the compatibility of the slip additive is not high enough. In this situation the higher compatibility materials could be used as the required addition rate would be more economically favourable.

Colour Measurement on Bottle Wall Sections

To check the impact of slip additives on the quality of non-coloured polyethylene terephthalate preforms, bottles were blown from the preforms made above. Colour was measured using a Minolta CM3700d spectrophotometer, in transmission mode. Colour is expressed as L*, a* and b*, which represent lightness (low values dark, high values light), red-green (high values red, low values green) and blue-yellow (low values blue, high values yellow). The delta values are the difference between the sample and a standard, in this case the clear polyethylene terephthalate control, expressed as:

$$\Delta E = (\Delta L^{*2} + \Delta a^{*2} + \Delta b^{*2})^{1/2}$$

| | Colorimetric Deltas vs. Clear polyethylene terephthalate | | | |
|---|---|---|---|---|
| Sample | ΔL* | Δa* | Δb* | ΔE |
| MJ5.169.1 | −0.21 | 0.01 | 0.18 | 0.28 |
| MJ5.169.4 | −0.24 | 0.01 | 0.24 | 0.34 |
| MJ5.169.5 | −0.03 | 0.00 | 0.02 | 0.04 |
| MJ5.169.6 | 0.01 | −0.01 | 0.01 | 0.02 |
| MJ5.169.7 | 0.00 | −0.01 | 0.01 | 0.01 |

The colour differences in blown bottles are all very small. Typically. ΔE values below 0.5 are not obvious to someone of normal colour vision and these values are all well below 0.5. The decrease in yellowness and increase in L* between the first two samples and the final three is attributable to the superior thermal stability and compatibility of these additives.

The invention claimed is:

1. A method of using a fatty acid ester as a slip additive in a thermoplastic moulding composition in the production of colourless moulded polyethylene terephthalate articles in the form of bottle preforms, the method comprising incorporating said fatty acid ester into a bottle preform moulded from polyethylene terephthalate, said slip additive reducing the coefficient of friction of the preform, wherein the fatty acid ester is selected from the group consisting of:
- (a) acetylated glycerol fatty acid esters;
- (b) sorbitan fatty acid esters; and
- (c) refined rapeseed oil, montanic acid triglyceride, PEG-400 dilaurate, PEG-200 dioleate, acetylated triglyceride, and mixtures of two or more thereof;

wherein the moulded polyethylene terephthalate articles in the form of bottle preforms are colourless; and wherein the thermoplastic moulding composition does not comprise a fatty amide.

2. A method according to claim 1, wherein the fatty acid ester is colourless.

3. A method according to claim 1 wherein the fatty acid ester is selected from acetylated glycerol fatty acid esters.

4. A method according to claim 3, wherein the acetylated glycerol fatty acid ester is ethoxylated glycerol monostearate.

5. A method according to claim 1, wherein the fatty acid ester is selected from sorbitan fatty acid esters.

6. A method according to claim 5, wherein the sorbitan fatty acid ester is selected from sorbitan monolaurate, sorbitan monooleate, sorbitan monopalmitate, sorbitan monostearate, and mixtures of two or more thereof.

7. A method according to claim 1, wherein the fatty acid ester is selected from refined rapeseed oil, montanic acid triglyceride, PEG-400dilaurate, PEG-200 dioleate, acetylated triglyceride, and mixtures of two or more thereof.

8. A method according to claim 1 wherein the fatty acid ester is present in the moulding composition in an amount effective to reduce the coefficient of friction of a moulded article formed from the moulding composition by at least 25% relative to the coefficient of friction of a corresponding moulded article formed from the moulding composition in the absence of the slip additive.

9. The method according to claim 1, wherein said fatty acid ester is a long chain fatty acid ester wherein the chain length is at least 12.

10. The method according to claim 1, wherein said fatty acid ester is a long chain fatty acid ester wherein the chain length is twelve to eighteen.

11. The method according to claim 1, wherein the amount of slip additive included in the thermoplastic moulding composition from which a said moulded article is produced is at least 0.1% w/w.

12. The method according to claim 11, wherein the amount of slip additive is at least 0.3% w/w.

13. The method according to claim 12, wherein the amount of slip additive is at least 0.4% w/w.

14. The method according to claim 13 wherein the amount of slip additive is no more than 0.5% w/w.

15. The method according to claim 1, wherein said slip additive is able to withstand injection moulding at a temperature in the range 260° C. to 310° C.

16. The method of claim 1, wherein the thermoplastic moulding composition does not comprise an oxygen scavenger.

17. The method according to claim 1, wherein said fatty acid ester is admixed with said polyethylene terephthalate.

18. A method of using a slip additive in a thermoplastic moulding composition in the production of moulded polyethylene terephthalate articles in the form of bottle preforms, the method comprising incorporating said slip additive into a bottle preform moulded from polyethylene terephthalate, said slip additive reducing the coefficient of friction of the preform, wherein the slip additive comprises a fatty acid ester and a further slip agent, wherein said fatty acid ester is selected from the group consisting of:
- (a) acetylated glycerol fatty acid esters;
- (b) sorbitan fatty acid esters; and
- (c) refined rapeseed oil, montanic acid triglyceride, PEG-400 dilaurate, PEG-200dioleate, acetylated triglyceride, and mixtures of two or more thereof; and wherein said further slip agent is a mineral oil.

* * * * *